(No Model.) 6 Sheets—Sheet 1.
J. E. MARBLE.
AUTOMATIC COUPLING FOR TRAIN PIPES.

No. 592,522. Patented Oct. 26, 1897.

Witnesses:
Harry T. Rohner
T. H. Libbey

Inventor
James E. Marble,
by Pennie & Goldsborough,
Attys.

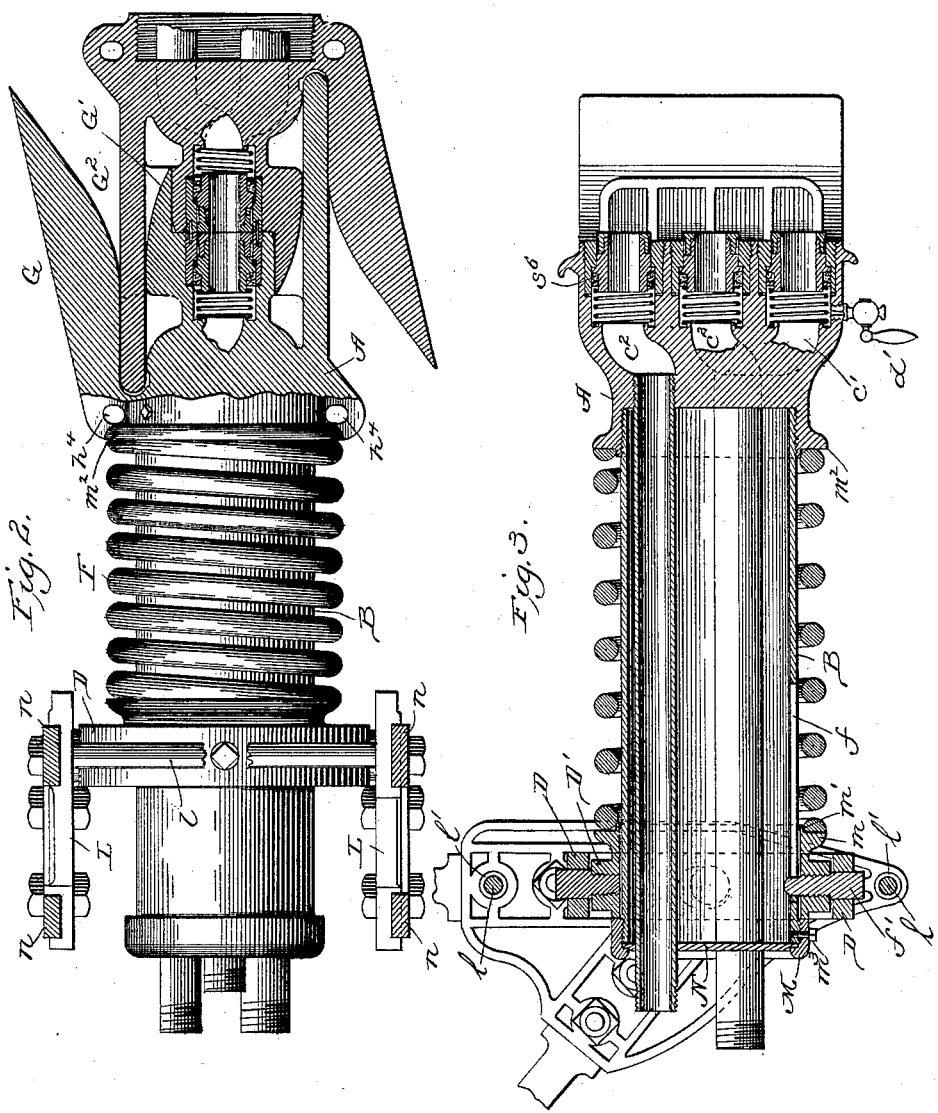

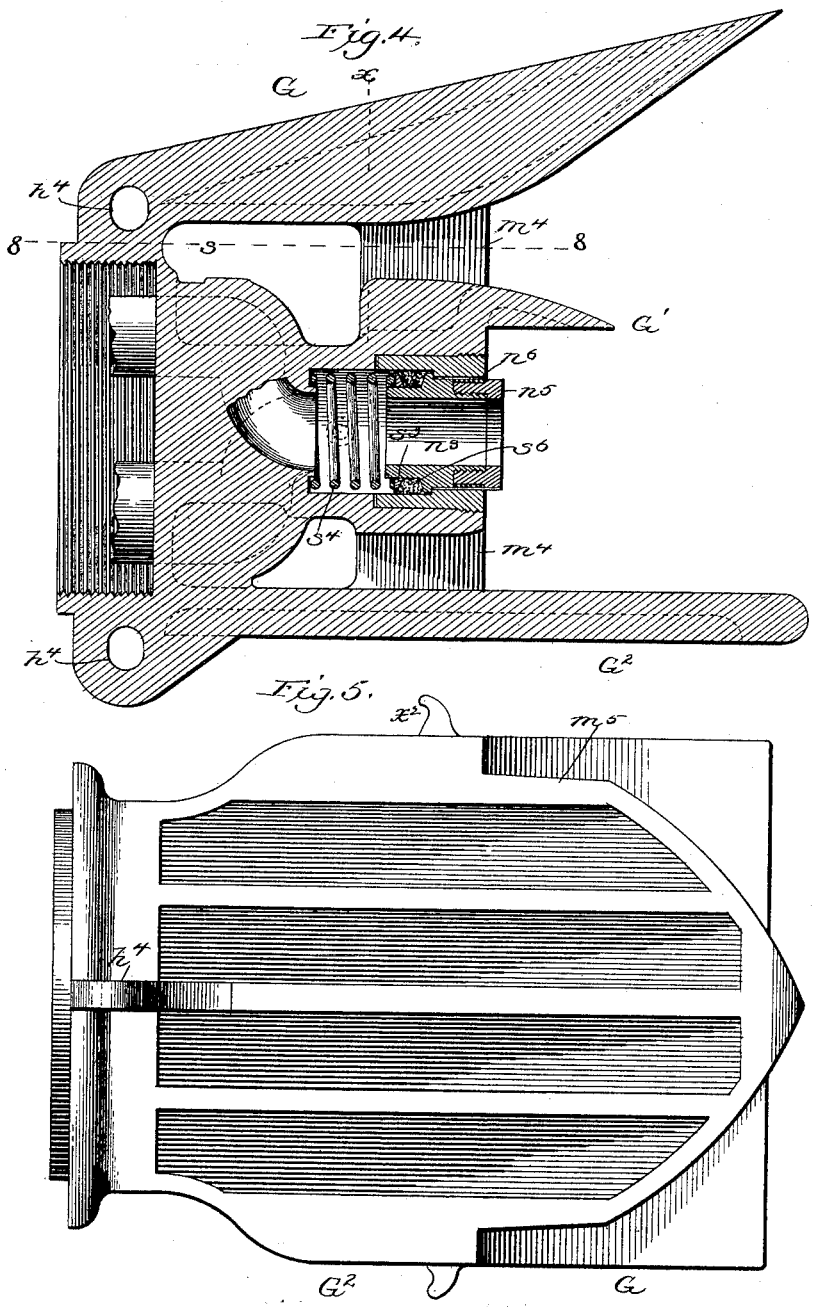

(No Model.) 6 Sheets—Sheet 4.

J. E. MARBLE.
AUTOMATIC COUPLING FOR TRAIN PIPES.

No. 592,522. Patented Oct. 26, 1897.

Witnesses:
Harry S. Rohrer
T. H. Libbey

Inventor:
James E. Marble
by Pennie & Goldsborough
Attys.

(No Model.) 6 Sheets—Sheet 5.
J. E. MARBLE.
AUTOMATIC COUPLING FOR TRAIN PIPES.
No. 592,522. Patented Oct. 26, 1897.

Witnesses: Inventor:
James E. Marble,
by Pennie & Goldsborough
Attys

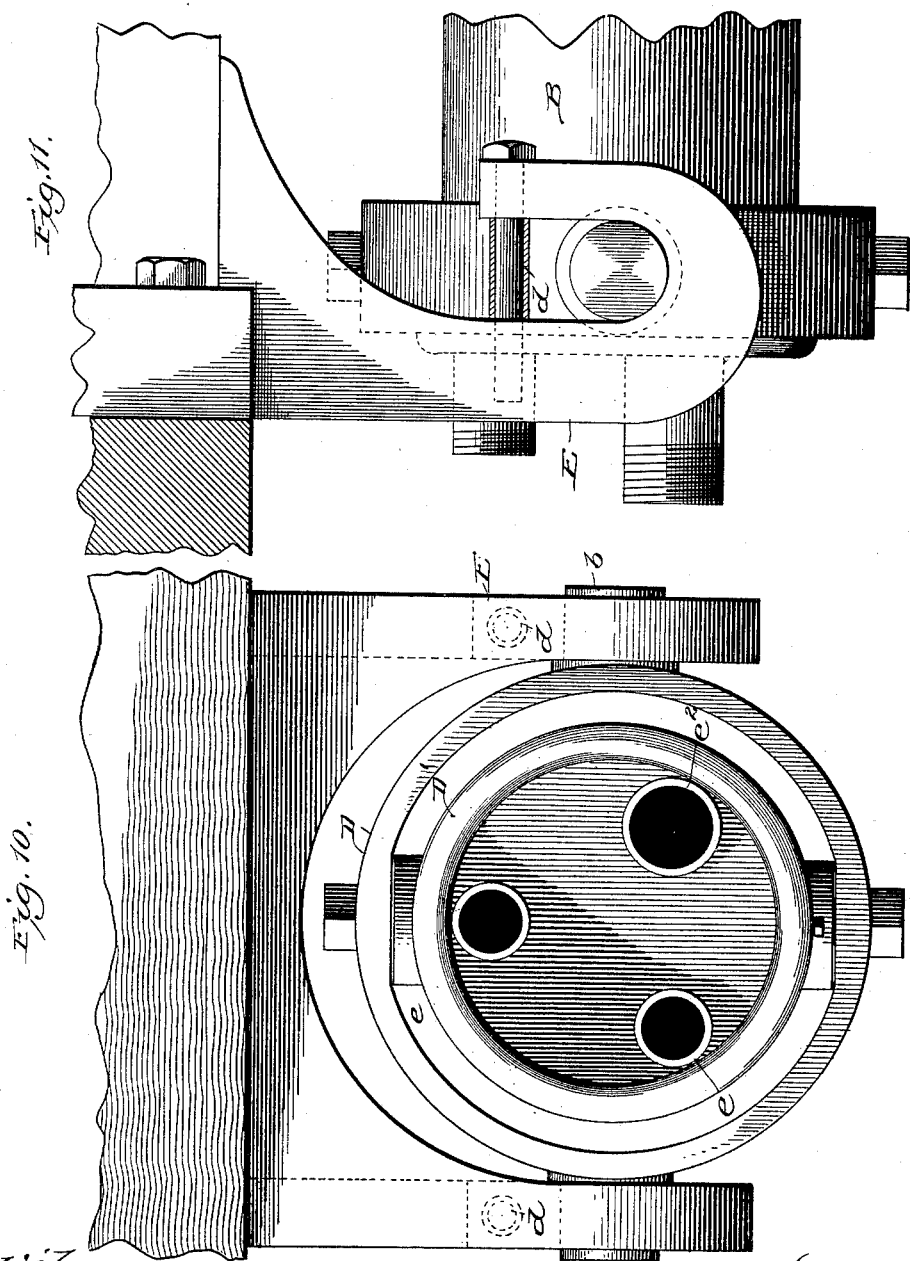

UNITED STATES PATENT OFFICE.

JAMES E. MARBLE, OF ALBANY, NEW YORK, ASSIGNOR TO EDWARD G. COX, OF SAME PLACE.

AUTOMATIC COUPLING FOR TRAIN-PIPES.

SPECIFICATION forming part of Letters Patent No. 592,522, dated October 26, 1897.

Application filed May 15, 1895. Serial No. 549,421. (No model.)

*To all whom it may concern:*

Be it known that I, JAMES E. MARBLE, a citizen of the United States, residing at Albany, in the county of Albany and State of New York, have invented certain new and useful Improvements in Automatic Couplers for Train-Pipes; and I do hereby declare the following to be a full, clear, and exact description of the invention, such as will enable others skilled in the art to which it appertains to make and use the same.

My invention relates to certain new and useful improvements in automatic couplers for connecting the fluid-conducting pipes of railway-trains—as, for instance, the pipes employed for conveying steam and compressed air to the several cars.

The practical construction illustrated herein is particularly applicable to a train-pipe system having a steam-conduit adapted to supply the usual heating-coils of the train and having air-conduits for the brake cylinders and signals, respectively; but it will be understood that the features of novelty claimed are not restricted to any particular train-pipe system, but are intended for employment wherever they may be separately or collectively used to advantage.

Figure 1:
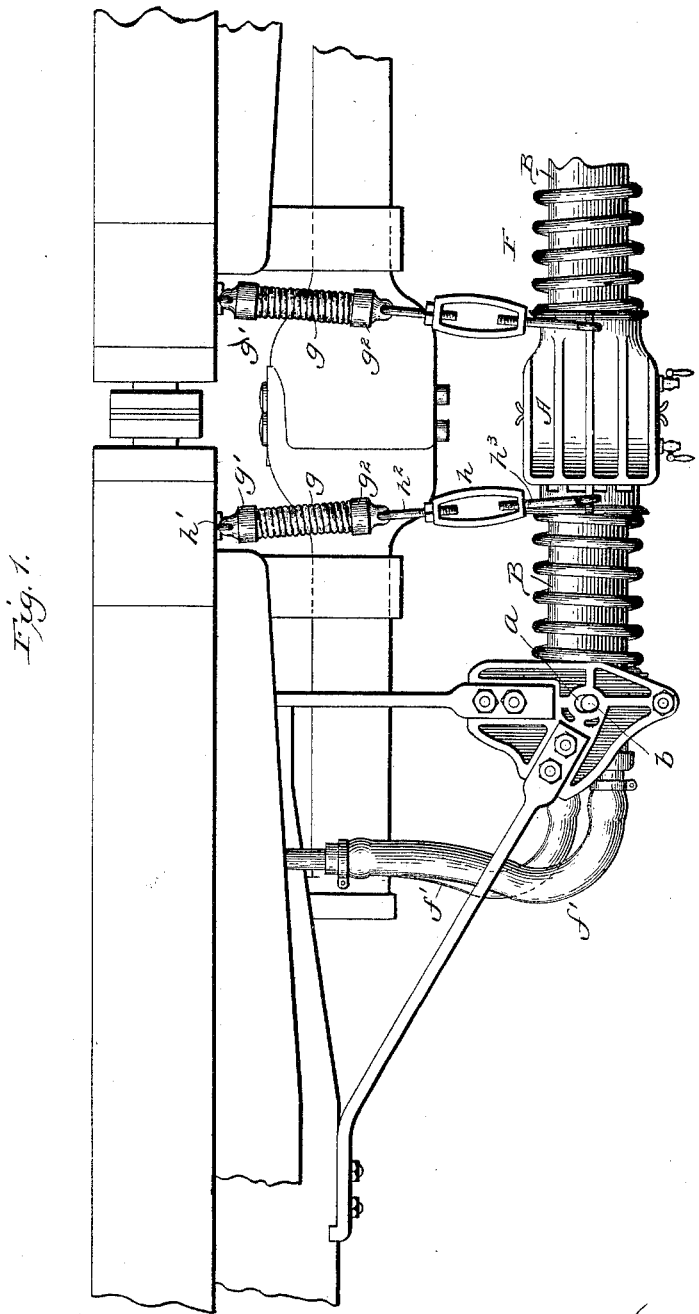
Figure 7:
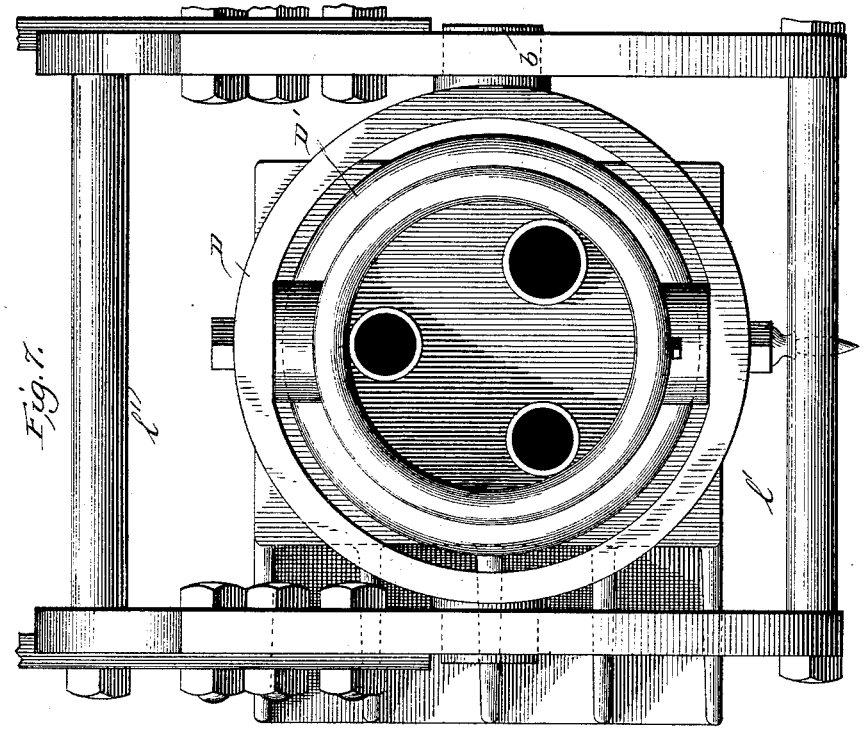
Figure 6:
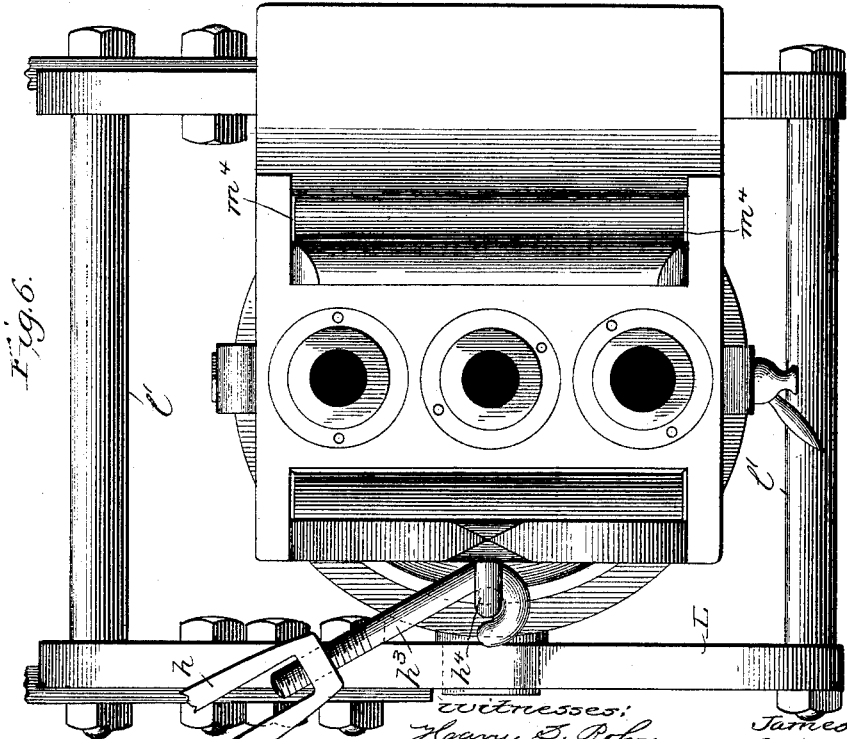
Figure 8:
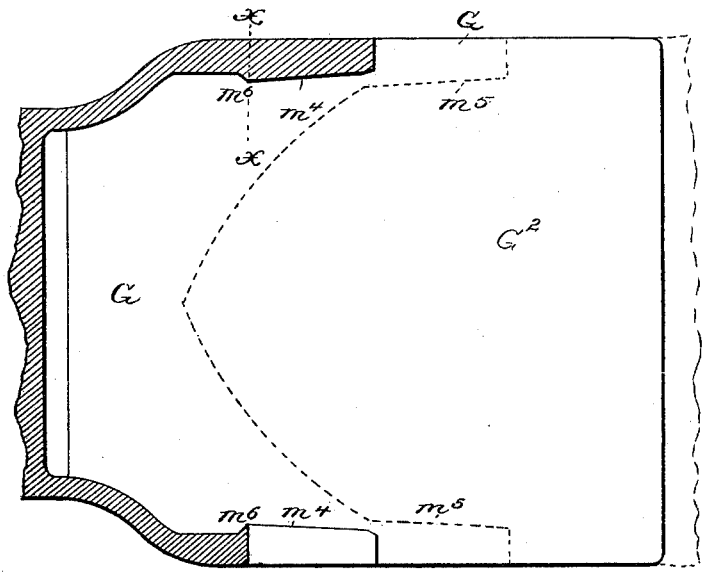
Figure 9:
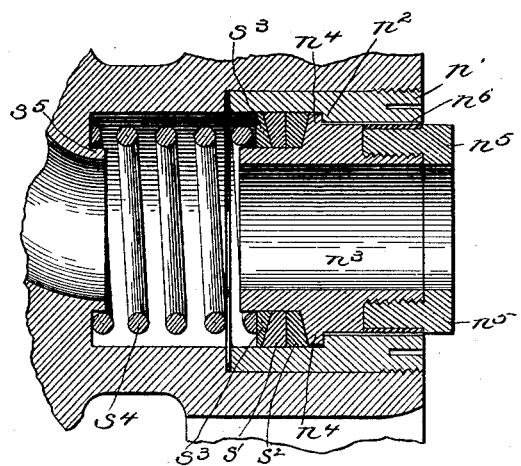

In the accompanying drawings, Figure 1 represents in side elevation the proximate ends of two railway-cars having their train-pipes coupled in accordance with my invention. Fig. 2 represents a plan view, partly in section, of one of the coupling members and its suspending devices and a sectional view of the coupling-head of the other member, the two members being shown as coupled together. Fig. 3 represents a view taken on a central longitudinal vertical plane through one of the coupling members and its suspending devices. Fig. 4 represents a horizontal central section of one of the coupling-heads. Fig. 5 represents a side elevation thereof. Fig. 6 represents a front elevation of one of the coupler members. Fig. 7 represents a rear elevation thereof. Fig. 8 represents a section on the line 8 8 of Fig. 4. Fig. 9 represents in section a portion of a coupling-head and one of its coupling-nipples and shows a modified construction of movable joint-packing therefor. Fig. 10 represents a rear end view of one of the coupling members and illustrates the manner of supporting the same from the tender-frame of a locomotive-engine. Fig. 11 represents the same, partly broken away, in side elevation.

Similar letters of reference indicate similar parts throughout the several views.

The coupling members on adjacent cars are designed to be homologous counterparts of each other and are suspended from the car-truck frame in like manner. Each is provided with a coupling-head A, cored out to form passages with which the steam and air pipes register, a protecting tube or casing B, and a universal joint between the truck-frame and the tube at the rear end of the latter, said joint consisting of two concentric rings D D', one of which is journaled to swing in a horizontal plane within the other, the outer one being journaled to swing in a vertical plane. This general arrangement is shown and its useful function described in my United States Patent No. 491,291. In the present construction I have supplemented its efficiency by providing that the gudgeons upon which the outer ring swings shall be set in loose journals, and for this purpose, as shown more particularly in Figs. 1 and 3, I have made the journal-openings $a$ larger than the gudgeons $b$, so as to give the outer ring D a capacity to tilt to a limited extent in a plane transverse to the length of the tube. This is of importance in order to protect the coupler when adjacent cars are passing around curves, at which time the tendency is for a torsional strain to be exerted by the one member upon the other. This strain is obviated by thus permitting the coupling members to tilt instead of restraining them therefrom, and a source of injury and danger to the integrity of the device is removed.

Where, as in Figs. 10 and 11, the outer ring is suspended from bent hangers E, the same effect is secured by placing the keeper-bolts $d$ at a short distance above the ring-gudgeons $b$. So far as I am aware it is broadly new to provide means for suspending the coupling members by means of a universal joint and at the same time to give to said coupling members a capacity to tilt in a plane transverse to their length, and I desire my broad claims upon the means for obtaining this characteristic function to receive a correspondingly broad interpretation.

When one of my coupler members is mounted upon the locomotive-engine, it is not necessary nor even desirable that the tube or casing B of said member should be capable of longitudinal movement within its inner ring, for the reason that the corresponding member of the locomotive-car coupler is rigid longitudinally, and consequently has no movement which would have to be compensated for. It will be noted, therefore, that in the construction shown in Figs. 10 and 11 no provision is made for obtaining a longitudinal movement of the tube or casing B. In cars coupled by the Gould, Trojan, or like coupling, however, such longitudinal movement is required, and accordingly the tube or casing B is, in the construction shown in Figs. 1, 2, and 3, adapted to slide rearwardly through the inner ring D' to an extent measured by the degree to which the spring F is compressed when the pipe-coupling is effected. In order to prevent the tube B from revolving during this retrograde movement or on its subsequent return, it may be slotted, as indicated at $f$, Fig. 3, said slot forming a way for the guide-pins $f'$, which is in fact one of the gudgeons upon which the inner ring is swiveled, or in substitution for or addition to said guide device the suspending spring-hangers at the forward end of the coupling member may be made so rigid as to maintain the coupler-head, and consequently the tube to which it is attached, against turning except when the parts as a whole tilt upon the horizontal gudgeons of the outer ring. To this end I employ spring-hangers whose spring element $g$ is tightly coiled and of tension calculated to resist any tendency of the head and tube to turn, except under the strong torsion produced when adjacent cars pass around a curve. The spring $g$ is screwed into the cap ends $g'$ $g^2$, which engage with hooks $h'$ $h^2$, the one connected to the car-truck frame and the other to the turnbuckle $h$, which has a hook $h^3$, engaging with a perforated lug $h^4$ upon the coupler-head. As indicated in Figs. 2 and 4, the coupler has two such perforated lugs $h^4$, and each furnishes the lower point of attachment of the turnbuckle-hook of a spring-hanger of the kind described.

The rings D D', constituting the universal joint, are mounted within a frame made up of the cheek-pieces L, connected by cross-bolts $l$, which pass through bracing-tubes $l'$, and secured rigidly to the truck-frame by means of the brace-bars $n$ in such manner as to give strength and stability to the frame. The inner ring D' is smooth upon its interior periphery, so as to permit the tube to work therein with but little friction, and adjacent to said ring D' is a loose annulus $m$, having a flange $m'$, which supports one end of the spring F, the other end of said spring being supported by a like flange $m^2$ upon the coupler-head A. By this expedient the spring is held out of contact with the exterior periphery of the tube, which has several advantages, among which may be mentioned that the tube and spring exert no frictional wear upon each other and are not liable to rust together when temporarily out of use, so as to make them subsequently work with difficulty or to make it troublesome to disassemble the parts should occasion require it.

When the train-pipe system comprises a steam-conduit, an air-signaling conduit, and an air-brake conduit, I arrange the corresponding coupling-pipes within the tube in such a manner that the steam-pipe will occupy a lower position therein, and I connect it to the lowermost passage $c'$ of the coupler-head, so as to localize all condensations of steam to that particular compartment, which compartment is provided with a petcock $d'$ for the purpose of drawing off any such condensation. It will be noted that the steam-pipe $e^2$, the signal-pipe $e$, and the air-brake pipe $e'$, are parallel to each other and to the inclosing tube B. At their forward ends they are screwed into screw-threaded passages of the coupler-head, which passages are continued forward in said head, so as to be arranged in a vertical series, one above the other, as shown. The rear ends of the pipes $e$ $e'$ $e^2$ are also screw-threaded and are adapted for ready connection with the train-pipes by means of hose connections $f'$, as indicated in Fig. 1. The tube B is screwed into a screw-threaded recess of the coupler-head A and at its rear end is provided with an external screw-thread. The end of the tube B is adapted to be closed by a plate N, suitably perforated for the passage of the pipes $e$ $e'$ $e^2$ and removably held in place by means of the retaining-ring M, which is screwed upon the end of the tube B, as shown, and is adapted to be secured against accidental loosening by means of the small-headed bolt $m^3$, passing through it and the shell of the tube B. This construction enables any of the pipes to be readily removed from the tubes, should it be necessary to do so, without interfering with the remaining pipes, and permits access to the interior of the tube B by simply removing the plate N and without disturbing any of the pipes $e$ $e'$ $e^2$.

The coupler-head is of general rectangular shape and at its outer end is provided with guide tongues or tenons G G' $G^2$, the two former being adapted to receive and guide between them the tongue $G^2$ of a conjoining head, and the tongue G' being adapted to fit in the recess formed between the tongue $G^2$ of a conjoining head and the adjacent body portion of the metal of said conjoining head, as indicated more fully in Fig. 2. In order to combine strength with lightness, the tongues G $G^2$ are provided with longitudinal external ribs having intermediate depressions, as shown. Upon their inner surfaces the tongues G G' are deflected gradually, as shown, so as to constitute a flaring guide-opening to direct the tongue $G^2$ of the conjoining head into the space between them. By reference to Fig. 4 it will be observed that the curves of the deflecting surfaces of the tongues G and G' gradually approach from their widest point of separation to a point indicated by the line $x\,x$, at which place they are separated by a distance equal to the thickness of the coöperating tongue $G^2$ of the conjoining coupler-head. Beyond this point the cored-out portion of the head terminates in a recess $s$ for the reception of the extreme end of the tongue $G^2$. By virtue of this construction and arrangement it will be apparent that as the two heads come together there will be no possibility of having the tongue $G^2$ bind between the tongues G G' until its extreme end has opened into the recess $s$, whereupon the coupling action is completed. Before the extreme end of the tongue $G^2$ has reached the recess $s$ it is held at but one point—i. e., along the line $x\,x$—and therefore cannot be cramped against inward movement between the tongues G G' at whatever angle it enters the flaring opening. I regard this as a feature of great importance to the successful operation of the device under the various conditions that may arise in its practical utilization.

On reference to Figs. 6 and 8 it will also be observed that the inner surfaces of the webs $m^4$, that connect the tongues G G', are beveled from within outwardly. In Fig. 8 I have indicated in dotted lines the approaching tongue $G^2$ of the conjoining head, in order to show that the relation of the bevels $m^4$ to the edges $m^5$ of the tongue $G^2$ is such that the width of the tongue $G^2$ between the edges $m^5$ is only equal to the distance between the points $m^6$, which lie in the plane of the line $x\,x$, so that edge binding or cramping of the tongue $G^2$ is impossible during the coupling operation.

To secure a satisfactory non-leaking joint between the ports of conjoining heads is a matter of considerable difficulty under the conditions of use to which the device is subjected. In the form shown in Fig. 9 I provide the port with a bushing $n'$, screwed therein and provided with a retaining-shoulder $n^2$. Within this bushing, which is made of brass or like practically non-corrodible material, is fitted a hollow non-corrodible nipple $n^3$, having a shoulder $n^4$ and screw-threaded at its forward end. Upon the screw-threaded end of the nipple $n^3$ is screwed an annular washer $n^5$ of a material sufficiently flexible to make a tight butt-joint. This annular washer is surfaced with a protecting-ring $n^6$ of non-corrodible material, separate from the washer $n^5$, or within which the composition body portion of the washer $n^5$ may be cast in the manufacture of the said washer, thus forming a composite article having a non-corrodible metallic circumferential periphery and a flexible or elastic outer edge portion. Any tendency of the washer to stick within the bushing $n'$ is therefore absent. In a former construction, wherein the sleeve $n^6$ was omitted and reliance placed upon the flexible character of the washer $n^5$ to afford a sufficiently tight fit within the bushing to prevent the leakage of air or steam, it was found that eventually the heat of the steam vulcanized the material of $n^5$ to such an extent as to cause it to contract away from the inner wall of the bushing and to therefore become no longer a safeguard against leakage. In the present construction the contact-surface is the brass ring $n^6$ of unvarying diameter, and the sliding joint is protected against leakage by a packing located back of the shoulder $n^4$. In the construction shown in Fig. 9 this packing consists of the brass split rings $s'\,s^2$, expanded to make an air and steam proof fit by means of a bearing-ring $s^3$, against which the spiral spring $s^4$ bears. The spiral spring is seated within a recess formed by the flange $s^5$ and is thus held centrally in place. These features of construction are the same in the modification shown in Fig. 4, with the exception that in the said modification an expansible ring $s^6$ of asbestos or like non-vulcanizable material is substituted for the two split rings.

Having thus described my invention, what I claim is—

1. The combination with a coupler, of a hanger provided with a gimbal supporting said coupler, said gimbal being loosely journaled in elongated vertical bearings; substantially as described.

2. A coupler provided with a head having fluid-passages, pipes connecting with said passages, an incasing tube for the pipes, and a hanger containing a gimbal supporting the tube, said gimbal being loosely journaled in elongated vertical bearings; substantially as described.

3. A coupler provided with a head having fluid-passages, pipes connecting with said passages, an incasing tube for the pipes, a hanger containing a gimbal supporting the tube, said gimbal being loosely journaled in elongated vertical bearings, and spring-hangers connected with opposite sides of the head; substantially as described.

4. A coupler, provided with a head having a series of fluid-passages whose outlets are arranged in the same central vertical plane and whose inlets are arranged in different vertical planes, pipes connecting with the inlets and parallel to each other, an incasing tube for the pipes, a hanger containing a gimbal through which the tube passes, and a closing-plate at the end of the tube, through which the pipes pass; substantially as described.

5. A coupler-head having central fluid-passages, and outlying tongues, one of which is straight and the other inclined and both of which are separated from the walls of the central fluid-passages by intervening recesses, and a third inclined tongue projecting from and forming a continuation of one of said walls, the said inclined tongues verging toward each other from without inwardly to practically a single plane of nearest approach and being separated thereat a distance equal to the thickness of the straight tongue; substantially as described.

6. A coupler-head having central fluid-passages and outlying tongues, one of which is straight and the other inclined and both of which are separated from the walls of the central fluid-passages by intervening recesses, and a third inclined tongue projecting from and forming a continuation of one of said walls, the said inclined tongues verging toward each other from without inwardly to practically a single plane of nearest approach and being separated thereat a distance equal to the thickness of the straight tongue and cross-webs connecting the tongues with the walls of the central fluid-passages said cross-webs being likewise inclined and verging toward each other from without inwardly to the plane of nearest approach; substantially as described.

7. A coupler-head fluid-outlet port, having therein a shouldered bushing, a corresponding shouldered spring-seated hollow nipple fitting within the bushing, an expansible packing between the nipple-shoulder and the spring, an annulus of elastic material fitted to the outer end of the nipple and a protecting-ring between said annulus and the bushing; substantially as described.

8. A coupler-head fluid-outlet port, having therein a shouldered bushing, a corresponding shouldered spring-seated hollow nipple fitting within the bushing, an expansible packing between the nipple-shoulder and the spring, an elastic face for the nipple, and an annular recess within which the inner end of the spring is contained; substantially as described.

In testimony whereof I affix my signature in presence of two witnesses.

JAMES E. MARBLE.

Witnesses:
 ALBERT HESSBERG,
 H. A. PECKHAM.